United States Patent Office 3,242,038
Patented Mar. 22, 1966

3,242,038
LAMINATES OF POLYALKENES AND CERTAIN BLOCK COPOLYMERS
Charles A. Dallas and Marvin A. Deisz, Berkeley, and Walter R. Haefele, Orinda, Calif., assignors to Shell Oil Company, New York, N.Y., a corporation of Delaware
No Drawing. Filed Aug. 11, 1964, Ser. No. 388,945
7 Claims. (Cl. 161—253)

This application is a continuation-in-part of our copending application Serial No. 275,688, filed April 25, 1963.

This invention relates to new and useful laminates or polyalkenes and certain block copolymers. The invention includes in the term "laminates" articles of polyalkenes coated with the subject block copolymers, articles of the block copolymers coated with polyalkenes and multiple laminates wherein the block copolymers are the bonding agent between a polyalkene surface and another solid surface.

Polyalkene plastic materials possess many desirable characteristics including inertness of most chemicals and solvents at ordinary temperatures, toughness and flexibility, particularly in the form of relatively thin sheets. Polyalkenes have found extensive use for containers or liners of containers, in coverings and in other allied uses. Many of these uses require that a seam be formed between two polyalkene surfaces or between a polyalkene surface and another solid surface. The physical properties (based on their chemical and stereoconfiguration) of polyalkene surfaces interfere with adhesion by most of the commonly employed adhesive or coating agents.

It has been observed also that certain adhesives for polyalkenes may form a bond which is of acceptable strength for a short period after completion but which, within a period of at most a few days, weakens to such an extent that the bonded surfaces may fall apart. Unlike vinyl resins, polyalkene surfaces cannot be joined electronically, that is, the dielectric characteristics of polyalkenes are such that subjecting it to a high frequency electric field will not induce bonding heat internally.

A number of methods have been proposed for the bonding of at polyalkene surface to another solid surface such as another surface of polyalkene or to a dissimilar surface such as a metal or a normal rubber. For the most part however, these bonds have either been low in strength or have required additional steps such as curing or previous surface cleaning. It is obvious that the necessity for curing or cleaning both increases the cost of manufacture of such bonded articles and at the same time usually requires subjecting at least a portion of the polyalkene to elevated temperatures or other conditions which it would be desirable to avoid.

It is an object of the present invention to improve the bonding of a polyalkene surface to a coating or laminating material. It is another object of the invention to improve the properties of polyalkene laminates. It is a particular object of the invention to provide improved laminates of two polyalkene surfaces. It is a special object of the invention to provide an improved bonded polyalkene surface which does not require vulcanization to reach its maximum tensile properties. Other objects will become apparent during the following detailed description of the invention.

Now, in accordance with the present invention, it has been found that an unaccountably strong bond is formed between a polyalkene surface and certain hydrogenated block copolymers, said copolymers having the general configuration, prior to hydrogenation of

A—B—A wherein each A is a polymer block of the group consisting of poly(vinyl arenes), poly(vinyl heterocycles) and cyclized polymer blocks of hydrocarbyl substituted conjugated dienes, and B is a conjugated diene polymer block, the average unsaturation of the hydrogenated polymer not exceeding 50% of the unsaturation of the unhydrogenated polymer. Still in accordance with the present invention, the articles of manufacture contemplated herewith include both 2-ply and multi-ply laminates, the only condition being that two of the adjacent laminates are a polyalkene surface on the one hand and a hydrogenated block copolymer as defined above on the other.

The hydrogenated block copolymers may be bonded to the polyalkene surface by a variety of means such as preforming a sheet of a block copolymer, applying it to the polyalkene surface and pressing it thereon utilizing sufficient heat and pressure to form a firm bond. Alternatively, the hydrogenated block copolymer may be applied to the surface in the form of a latex or cement formulated as desired and thereafter evaporating or removing the vehicle to leave a deposited structure such as a film or coating on the surface of the polyalkene.

One of the major advantages gained by the use of the subject class of hydrogenated block copolymers in addition to their unexpectedly outstanding adhesion to the polyalkene surface is the fact that they do not require curing or vulcanizing in order to reach their maximum physical properties. The nature of the block copolymers, as will be discussed more fully hereinafter, is such that vulcanization or curing is unnecessary, although such curing may be carried out if desired especially if the copolymers utilized in conjunction with a normally unsaturated rubbery material.

The alpha olefin polymers to be used in accordance with the present invention are ethylene, propylene, or higher olefin polymers (including homo-and copolymers), and include atactic, syndiotactic or isotactic structures. The beneficial effects are particularly noticeable when using alpha olefin polymers comprising at least about 55% of crystalline structure and particularly when the average molecular weight of the alpha polymer is in excess of about 30,000.

The isotactic structure comprises portions of the molecule of an alpha olefin polymer in which, when the molecule is arbitrarily assumed to be fully extended in a plane, the R substituents (alkyl) on the tertiary carbon atoms of adjacent monomeric units making up the given section of the molecular main chain are all on one side (e.g., above) and the hydrogen atoms bound to said tertiary carbon atoms are all on the other side of the plane of the chain. In a successive syndiotactic portion of the same chain, the position of the alkyl and hydrogen substituents may be reversed with respect to the positions they occupy in the previous portion. Isotactic molecules are linear, regular, head-to-tail molecules having substantially the isotactic structure.

The isotactic polymers may be obtained, for example, by polymerizing an alpha olefin in an inert hydrocarbon solvent with catalysts prepared from compounds of heavy metals of the first sub-group of Groups IV–VI of the Periodic Table and organometallic compounds of metals of Groups II–III of that Periodic Table. It has also been shown that depending upon the specific catalyst used in the polymerization, the crude polymerizate may be a mixture of isotactic and atactic polymers with a prevalence of the atactic structure, which can be separated by means of selective solvents or the crude polymerizate may be predominantly, e.g., over 50% to substantially all, isotactic. Thus, when the catalyst is prepared from a high valency halide of a transition metal, such as titanium tetrachloride and triethyl aluminum, and is substantially non-crystalline insoluble to finely dispersible in the hydrocarbon solvents, the crude polymerizate is generally substantially amorphous but contains some isotactic polymers which can be separated by means of selective solvents from the crude product.

On the other hand, it also has been shown that when the catalyst is prepared from a low valency transition metal halide such as titanium trichloride and triethyl aluminum and is substantially solid, crystalline and hydrocarbon-insoluble, the crude polymerizate consists prevailingly to substantially of isotactic macromolecules which are substantially crystalline under normal conditions. Selective solvent extraction may be employed to concentrate isotactic polymers from the crude polymerizate.

The alpha olefin polymers may not only comprise homopolymers such as polyethylene or polypropylene, polybutene or polypentene, but also may be copolymers, preferably of the plastic (non-elastomeric) type such as the non-elastomeric copolymers of ethylene and propylene. These usually are copolymers in which the propylene content is relatively low, e.g., 85–98% ethylene, the remainder being propylene units. Molecular weight of the polymers may range all the way from about 500 to as much as 2 million or higher, but the major emphasis is placed upon polymers having molecular weights in excess of 10,000 and preferably in excess of about 30,000, usually 200,000–500,000.

In addition to the polyalkenes described above, other hydrocarbon polymers may be used in admixture with polyalkenes or by themselves such as substantially saturated hydrogenated polymers of styrene or of conjugated dienes. These are typified by hydrogenated polybutadiene and hydrogenated polyisoprene. Furthermore, the polyalkenes described above, may be modified if desired by incorporation within the body of the polyalkene (as distinguished from the laminated body adhere to the surface thereof) up to about 50% by weight of the type of hydrogenated block copolymers to be described more fully hereinafter. The incorporation of such materials improves the high impact properties thereof as well as other physical properties such as tensile strength and flexibility.

The block copolymers with which the present invention is concerned comprise those having the structure (prior to hydrogenation)

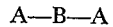

A—B—A wherein the polymer blocks A have average molecular weights from 4000–115,000 and preferably from 8000 to 60,000. The monomers from which the terminal polymeric blocks are formed comprise vinyl cycloaromatic hydrocarbons as well as mixtures thereof. The center block comprises one derived from the polymerization of conjugated dienes and preferably those having from 4–10 carbon atoms per molecule, the average molecular weight of the center block being between about 20,000 and 450,000, preferably between about 50,000 and 300,000. An essential aspect of these copolymers comprises the low degree of unsaturation thereof provided either by the selection of monomers employed in forming the block copolymer or by hydrogenation of the polymer following its formation. Therefore, the diene polymer block as it is to be used in the subject compositions either inherently possesses or is hydrogenated to create an iodine number between about 0 and 50 and preferably lower than about 25 g. $I_2$ per 100 g. of polymer and an ultra-violet analysis indicating that at least 70% by weight thereof comprises cycloalkane units.

While the present invention broadly considers the outstanding adhesion achieved between the subject class of hydrogenated block copolymers and surfaces of polyalkenes, maximum results are obtained within a clearly defined range which incorporates not only the individual block molecular weights but also the ratio of non-elastomeric end blocks to elastomeric center blocks. With respect to individual block molecular weights in the block copolymers, outstanding adhesion results are obtained when the non-elastomeric blocks have average molecular weights between about 12,500 and 50,000 and when the elastomeric polymer blocks have average molecular weights between about 60,000 and 300,000. Still more preferred are 3-block copolymers of the A—B—A type which have molecular weights in the range 15,000–75,000–15,000 to 40,000–240,000–40,000. With respect to the ratio of non-elastomeric blocks to elastomeric polymer blocks, outstanding results are especially obtained when the hydrogenated block copolymer contains between about 10 and 35% of non-elastomeric polymer blocks preferably between about 20 and 33% by weight thereof.

The block polymers are preferably formed from two types of monomers, the end groups being prepared from vinyl cyclohydrocarbons, said end polymer blocks having a substantially non-elastomeric character, while the center blocks are characterized by an elastomeric set of properties. Still more preferably, the block copolymers are those in which the end blocks prior to hydrogenation comprise polymer blocks of a vinyl aromatic hydrocarbon connected by a block of a $C_{4-10}$ conjugated diene.

The block copolymers may be characterized by a substantial difference in the glass transition temperature between the end blocks and the center block.

The block copolymers are preferably hydrogenated by the use of catalysts known in the hydrogenation art such as nickel on kieselguhr and the like to reduce the unsaturation of the polymer below the limits specified hereinbefore. Hydrogenation not only provides for improved adhesion to the olefin polymers but also substantially improves the thermal and oxidative resistance of the block copolymers.

The elastomeric mid-sections may be produced by the polymerization originally of such conjugated diolefins as butadiene and isoprene as well as methyl isoprene. The non-elastomeric end polymer blocks may comprise homopolymers or copolymers and preferably are prepared from alkenyl aromatic hydrocarbons, particularly vinyl aromatic hydrocarbons wherein the aromatic may be either monocyclic or polycyclic. Typical species include styrene, methylstyrene, vinyl xylene, ethyl vinyl xylene, stilbene, vinyl cyclobutene, vinyl cyclopentene, vinyl naphthalene and the like.

The block copolymers may be prepared by several alternative routes preferably with the use of lithium based catalysts. If a mono hydrocarbon lithium is utilized as the catalyst, the block copolymer formation proceeds by a sequence of steps in which the vinyl cyclic hydrocarbon compound is polymerized with the use of the lithium based catalyst, forming a living polymer terminated with a lithium radical, adding to the polymerization mixture at least one conjugated diene, continuing the polymerization until the desired block length is achieved and thereafter adding a second amount of the same or a different vinyl cyclic hydrocarbon.

The preferred class of catalysts most useful for the preparation of the subject block polymers comprise lithium metal, alkyl lithium compounds and aromatic compounds containing one or more lithium radicals.

These include alkyl lithiums such as butyl lithimums, amyl lithiums, hexyl lithiums, and dilithium initiators such as dilithium naphthalene, dilithium stilbene and the like.

When utilizing dilithium initiators, it is possible to first polymerize the conjugated diene to form the center block terminated on each end with a lithium radical and thereafter add the alkenyl cyclo hydrocarbon to form simultaneously the two terminal blocks.

Still another general process for the preparation of the block copolymers comprises a coupling step. In such processes a first polymer block A is formed, after which a diene is block polymerized to form a "living" block intermediate copolymer, e.g., A—B—Li. A coupling agent such as dihalohydrocarbon is then used to couple these intermediates to form A—B—X—B—A, wherein X is the residue of the coupling agent. The product is regarded as having the structure A—B—A discussed above.

Polymerization is normally conducted at temperatures in the order of −80 to +100° C. with a proportion of catalyst chosen to obtain the desired block molecular weight. The precise conditions of polymerization do not form a part of the present invention.

In addition to the type of block copolymer defined hereinabove, another desirable type useful for the present purpose comprises the block copolymer having the generalized formula

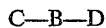

C—B—D wherein B is as defined hereinbefore, namely, a polymer block of a conjugated diene, in this case a conjugated diene having a substantially unbranched and unsubstituted configuration. Typical of these is butadiene. The polymer block C comprises a cyclized polymer block of a hydrocarbyl substituted conjugated diene. Typical of these is a polyisoprene block which has been cyclized by treatment with an acid such as boron trifluoride, aluminum trifluoride, or other amphoteric metal halides. The polymer block D comprises either a vinyl arene block (of the class referred to as polymer block A in the block copolymer having the first configuration of A—B—A), a polymerized vinyl heterocyclic compound, e.g., 2-vinyl pyridine, or a second cyclized hydrocarbyl-substituted conjugated diene polymer block. A typical block copolymer of this configuration would be polyisoprene-polybutadiene-polyisoprene, or polyisoprene - polybutadiene-polystyrene wherein the polyisoprene blocks have been subjected to a cyclizing procedure. It has been found that the block copolymers may be prepared and thereafter subjected to selective cyclization whereupon only the hydrocarbyl-substituted conjugated diene polymer blocks are effectively cyclized, the straight chain conjugated diene polymer blocks such as polybutadiene and the vinyl arene or vinyl heterocyclic blocks being essentially unchanged. The preferentially cyclized block copolymers exhibit the same advantageous property of "self-curing," thus requiring no vulcanizing or curing step to maximize their physical properties.

Having obtained the block copolymer, this may be followed by hydrogenation if such is necessary to reduce the unsaturation of the polymer below the maximum figures specified hereinbefore. The products obtained by these and other methods and useful in the compositions of this invention comprises the substantially linear block copolymers wherein the end groups prior to hydrogenation may be represented for example with polymer blocks of styrene and center blocks of polymerized isoprene or of butadiene. After hydrogenation, assuming that substantially complete saturation of the molecule is obtained, the product may be represented, for example, by a saturated polymer wherein the end groups comprise polymerized vinyl cyclohexane while the center elastomeric section comprises ethylenepropylene elastomers. When hydrogenation is not complete, the final product will be modified from this simplified fully saturated example.

For instance, while the end groups would primarily comprise saturated polymers, there may be a certain small proportion of unsaturated radicals remaining. The same may be true of the elastomeric center section, but it is possible to hydrogenate the diene center block completely, while the hydrogenation of the terminal blocks may be 50-100% complete.

Hydrogenation of the block copolymers is conducted under conditions which will saturate at least about 50% of the double bonds originally present. It is preferred that at least about 75% of the double bonds be removed by hydrogenation and best results are obtained relative to stability and compatability with the polyalkenes if at least about 90% of the original unsaturation is removed by hydrogenation.

A variety of catalysts may be employed for this purpose including particularly cobalt or nickel salts or soaps reduced with aluminum alkyl compounds; platinum deposited on a diatomaceous earth; nickel deposited on kieselguhr and others.

Hydrogenation is preferably carried out at temperatures between 0° C. and 225° C. for periods ranging from 5 minutes to 24 hours, depending on the activity of the particular catalyst employed, the response of the particular block copolymer being hydrogenated and the temperature and hydrogen pressure (1-20 atmospheres) utilized. Some of the catalysts (such as the nickel and cobalt catalysts) have been found to be highly selective in that they rapidly hydrogenate the conjugated diene polymer blocks and only thereafter hydrogenate vinyl arene polymer blocks usually over substantially longer times and preferably at higher temperatures. Thus, it is possible to selectively hydrogenate the polymer if it is so desired.

Two principle situations exist where this intense adhesion of the block copolymers to polyalkene surfaces may be advantageously employed: the first of these may be considered a 2-ply laminate in that one of the surfaces comprises the block copolymer and the other surface comprises the polyalkene. These could either be films or, on the contrary, may be articles of any shape having a coating of the second polymer. The second principle situation comprises laminates of more than two layers, the simplest of which would be one in which the two outer layers comprise one of the polymers, e.g., polyalkene, while the middle bonding layer comprises the second polymer, e.g., the hydrogenated block copolymer. The reverse type of three-ply laminate is equally interesting, namely one in which the two outer layers are the hydrogenated block copolymer with a bonding layer of the polyalkene.

Either or both of the essential components of the article of manufacture, namely, the hydrogenated block copolymer or the polyalkene may be compounded with other compenents known in the art, including synthetic and natural reinforcing fillers such as carbon black, asbestos fibers, titanium dioxide, other pigments, plasticizers, flow assist agents and the like.

The laminated articles may be used for a wide variety of purposes depending on their specific shapes. The most important shapes would be that of laminated films. In the instance where one of the surfaces constitutes a "coating" on the other polymer, the latter may assume any desired shape determining the eventual end use of the article. Either or both of the components of the article may be formed by thermoplastic processing operations in which the article may be injection molded, blow molded, compression molded, extruded to form film, etc.

The following examples illustrate the advantages of the present invention:

EXAMPLE I

*2-ply laminate*

A polypropylene surface was coated with a toluene solution of block copolymers having block molecular weights given in the table below. Both non-hydrogenated and hydrogenated copolymers were tested. The toluene was then evaporated and the resulting 2-ply laminates bonded together under a pressure of 32 p.s.i. at a temperature of 150° C. for 30 minutes. The best bond strength so developed was in excess of 1000 p.s.i. in tensile shear when tested according to ASTM procedure, designation D–1002–53T using six test specimens for each type. For comparison, the bond strength in terms of tensile shear developed by commercial adhesives when similarly applied to untreated polypropylene surfaces did not exceed 300 p.s.i.

It will be seen that the non-hydrogenated block copolymers failed to bond properly, as did hydrogenated block copolymers of relatively low molecular weight.

| Type of Polymer | Block Molecular Weights | Tensile Shear Strength, p.s.i. | Bond Failures, Percent |
|---|---|---|---|
| Polystyrene-polybutadiene-polystyrene | 16,000-69,000-16,000 | 241 | 100 |
| Polystyrene-polyisoprene-polystyrene | 15,000-75,000-15,000 | 243 | 100 |
| Polystyrene-polyisoprene-polystyrene | 43,000-103,000-38,000 | 114 | 100 |
| Hydrogenated polystyrene-polyisoprene-polystyrene | 5,000-40,000-5,000 | 238 | 100 |
| Hydrogenated polystyrene-polyisoprene-polystyrene | 10,000-50,000-10,000 | 417 | 100 |
| Hydrogenated polystyrene-polyisoprene-polystyrene | 10,000-75,000-10,000 | 273 | 100 |
| Hydrogenated polystyrene-polyisoprene-polystyrene | 15,000-75,000-15,000 | 1,047 | 17 |
| Hydrogenated polystyrene-polyisoprene-polystyrene | 15,000-100,000-15,000 | 998 | 0 |
| Hydrogenated polystyrene-polyisoprene-polystyrene | 40,000-240,000-40,000 | 686 | 0 |

The advantages demonstrated by the above-described tests are striking particularly in view of the exceptionally high tensile shear strength but also in view of the fact that the polypropylene surface had not been treated in any manner such as defeating or oxidation for the purpose of improving its receptivity of the laminating block copolymer.

While laminates according to the present invention are outstanding for common wrapping purposes, special treatment of them may be employed to produce particular structures and effects. For example, stretching the preformed laminate in at least one direction and thereafter releasing the stretching force results in a buckled laminate which can be used for such novelty purposes as ribbons, wrapping etc.

One of the beneficial aspects of the invention relies upon the outstanding stability of the hydrogenated block copolymers. Thus, the coating of a polyolefin, such as polypropylene, with the block copolymer results in an article suitable for outdoor items. The addition of phenolic or aromatic anti-oxidants to either or both layers improves stability still further.

The application of the coatings or laminating layers may be by pre-forming films and heat-sealing; painting or spraying cements and evaporating the solvents; tumbling or spray coating powders followed by heat coalescence; plastisol or latex application; hot melt application, etc.

In certain cases, it may be advantageous to mix up to about 35% by weight based on the total of polyolefin with block copolymers in forming one of the laminate (including coating) layers, or to mix up to about 35% block polymer into at least one of the polyolefin coating or structures. These modifications not only increase adhesion of one layer with another but also result in controlled modification of elasticity, flexibility, modules and impact resistance.

We claim as our invention:

1. An article of manufacture comprising a laminate of a solid polymer of a 1-olefin having a maximum of 8 carbon atoms per molecule and an unvulcanized hydrogenated block copolymer having the general configuraiton, prior to hydrogenation of

A—B—A wherein each A is a vinyl arene polymer block and B is a poly(conjugated diene) block, at least 50% of the double bonds of the block polymer being saturated by hydrogenation subsequent to polymerization, the average molecular weight of each block A being between about 12,500 and 50,000 and the average molecular weight of block B being between about 60,000 and 300,000.

2. An article of manufacture comprising a laminate of a solid metal and a solid polymer of a 1-olefin having a maximum of 8 carbon atoms per molecule, the metal and polymer being bonded with an unvulcanized hydrogenated block copolymer having the general configuration, prior to hydrogenation, of

A—B—A wherein each A is a vinyl arene polymer block and B is a poly(conjugated diene) block, at least 50% of the double bonds of the block polymer being saturated by hydrogenation subsequent to polymerization, the average molecular weight of each block A being between about 12,500 and 50,000 and the average molecular weight of block B being between about 60,000 and 300,000.

3. An article of manufacture comprising a laminate of two surfaces of solid polymers of 1-olefins having a maximum of 8 carbon atoms per molecule bonded with an unvulcanized hydrogenated block copolymer having the general configuration, prior to hydrogenation, of

A—B—A wherein each A is a vinyl arene polymer block and B is a poly(conjugated diene) block, at least 50% of the double bonds of the block polymer being saturated by hydrogenation subsequent to polymerization, the average molecular weight of each block A being between about 12,500 and 50,000 and the average molecular weight of block B being between about 60,000 and 300,000.

4. An article of manufacture comprising a laminate of an elastomer and a solid polymer of a 1-olefin bonded with an unvulcanized hydrogenated block copolymer having the general configuration, prior to hydrogenation of

A—B—A wherein each A is a vinyl arene polymer block and B is a poly(conjugated diene) block, at least 50% of the double bonds of the block polymer being saturated by hydrogenation subsequent to polymerization, the average molecular weight of each block A being between about 12,500 and 50,000 and the average molecular weight of block B being between about 60,000 and 300,000.

5. An article of manufacture comprising a laminate of a solid polymer of at least one alpha olefin having 2-4 carbon atoms per molecule and an unvulcanized hydrogenated block copolymer having the general configuration, prior to hydrogenation of poly(vinylarene)-poly(conjugated diene)-poly(vinylarene)

wherein the molecular weights of the poly(vinyl arene) blocks are between about 12,500 and 60,000, the molecular weight of the poly(conjugated diene) is between about 60,000 and 300,000 and at least 50% of the double bonds of the block polymer being saturated with hydrogen subsequent to polymerization.

6. An article according to claim 5 wherein the olefin polymer is polypropylene.

7. An article according to claim 5 wherein the block copolymer prior to hydrogenation has the configuration polystyrene-polyisoprene-polystyrene

References Cited by the Examiner

UNITED STATES PATENTS

| 2,731,439 | 1/1956 | Jones et al. | 26—879 |
| 3,035,953 | 5/1962 | Arnold | 161—253 |
| 3,035,954 | 5/1962 | Jones et al. | 161—253 |

FOREIGN PATENTS

| 168,182 | 12/1954 | Australia. |
| 587,662 | 11/1959 | Canada. |
| 616,458 | 3/1961 | Canada. |
| 820,089 | 9/1959 | Great Britain. |
| 821,971 | 10/1959 | Great Britain. |
| 852,823 | 10/1960 | Great Britain. |

EARL M. BERGERT, *Primary Examiner.*